United States Patent Office

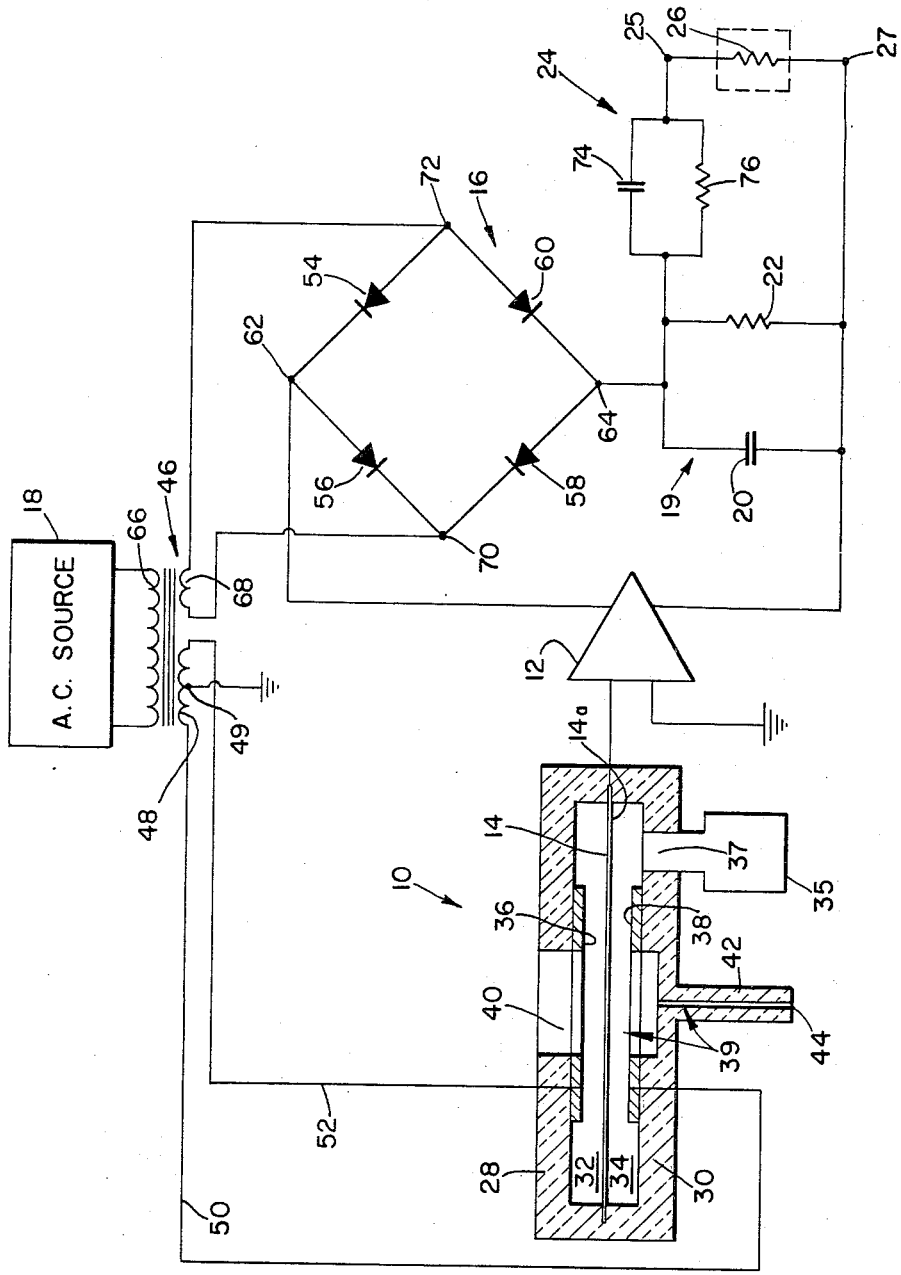

3,374,671
Patented Mar. 26, 1968

3,374,671
VERTICAL RATE SENSOR
Sidney B. Williams, Lexington, and Edward T. Rigney, Wayland, Mass., assignors to Trans-Sonics, Inc., Burlington, Mass.
Filed Mar. 31, 1965, Ser. No. 444,137
12 Claims. (Cl. 73—179)

ABSTRACT OF THE DISCLOSURE

A vertical rate sensor having high resolution of vertical direction and fast response to changes in rate employs a differential pressure transducer and an electrical compensating circuit that develops the sensor output signal in response to the transducer signal. The transducer compares two pressures developed by sensing the atmospheric pressure with a pneumatic circuit of essentially zero time constant and a pneumatic circuit of relatively long time constant. The compensating circuit is a lead circuit having an electrical time constant matched to the longer time constant of the two pneumatic circuits to offset the delay introduced by that long time constant.

---

This invention relates to an instrument for measuring rate of change of elevation. More particularly, the invention concerns a vertical velocity measuring instrument characterized by minimal uncertainty even at near-zero readings, together with fast response to changes in vertical velocity.

In a vertical rate sensor of the present type, a pressure transducer responds to the difference between the present atmospheric pressure around the sensor and the atmospheric pressure a short time earlier. This is done with a diaphragm-type pressure transducer in which one side of the diaphragm is vented directly to the atmosphere and the other side is vented to the atmosphere through a thin tube or capillary having a relatively high pneumatic resistance.

The pressure at the capillary aperture exposed to the diaphragm corresponds to the atmospheric pressure at the elevation of the transducer a brief time earlier. The pressure at the other side of the diaphragm is the atmospheric pressure at the transducer's present elevation. With this arrangement, the deflection of the diaphragm corresponds to the change in the atmospheric pressure in a brief time interval and hence to the rate at which the elevation of the transducer is changing.

In one transducer of this type, a conductive plate is spaced on each side of a conductive diaphragm to form a pair of capacitors whose relative capacitances depend on the position of the diaphragm. The capacitors are connected in a bridge circuit with an alternating current source. The output voltage of the bridge is a measure of the deflection fo the diaphragm.

The phase of this voltage shifts by 180° when the direction of deflection reverses. Thus, the phase indicates whether the elevation of the transducer is increasing or is decreasing. This information is conventionally detected with a phase detector that develops a direct voltage whose polarity corresponds to the phase of the bridge output signal and hence to the direction of vertical velocity.

When the sensor has no vertical motion, the output signal should be zero. However, in practice, there are several error sources that offset the zero-signal condition from zero vertical rate. Hence, the instrument may produce a significant electrical signal at zero vertical motion, and zero signal when experiencing a small but measurable vertical movement.

This zero shift error has little effect when the instrument is moving vertically at a rapid rate. However, when the elevation is changing slowly, the zero shift error becomes significant; it can even cause an output indication whose polarity is opposite to the actual vertical movement.

The zero shift error, and the resultant direction uncertainty at small vertical velocities, are particularly objectionable in aircraft performing instrumented maneuvers such as landing. Moreover, the error or uncertainty generally increases when the instrument temperature changes. This is due to temperature-dependent changes in the instrument components.

Accordingly, it is an object of the present invention to provide improved apparatus for measuring vertical velocity in the atmosphere.

A more particular object of the invention is to provide an instrument that gives a reliably correct indication of the direction in which elevation is changing even when the vertical velocity is extremely small.

A further object of the invention is to provide an instrument having the foregoing features and further characterized by fast response.

Another object of the invention is to provide such an instrument that is relatively insensitive to temperature changes, and it is a particular object to provide such an instrument that does not require special temperature-stable components.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawing which is a schematic diagram of an instrument embodying the invention.

The foregoing problem regarding the uncertainty in the direction of vertical velocity can be largely solved by substantially increasing the time constant of the pneumatic coupling between the diaphragm and the outer end of the capillary. This increases the time interval for the change in atmospheric pressure sensed by the pressure transducer. Thus, the pressure differential to which the transducer responds corresponds to a materially greater change in altitude for a given vertical velocity.

In other words, there is a manifold increase in the pressure differential across the diaphragm for a given vertical velocity, and the sensitivity of the transducer is improved to such a degree that even small vertical rates unambiguously deflect the diaphragm by a relatively large amount. Moreover, the large transducer signal renders practically negligible uncertainties introduced in the other parts of the sensor.

However, this solution to the problem of "direction uncertainty" introduces a corresponding lengthening of the response time of the instrument. As a result, the instrument is incapable of following rapid changes in vertical velocity. For example, the instrument may indicate continued descent for an unduly long time after the aircraft carrying it has levelled off.

The invention overcomes this problem, and hence provides a rate of vertical travel instrument in which zero-center uncertainties are essentially resolved and, yet, in which the response time is suitably short.

More particularly, referring to the drawing, a transducer indicated generally at 10 applies to an amplifier 12 an electrical signal corresponding to the difference in pressure across a transducer diaphragm 14. A phase detector indicated generally at 16 receives the amplified transducer signal, compares its phase with that of a source 18 of alternating voltage and develops a direct output voltage across a filter circuit 19. The polarity of this voltage changes according to the direction in which the diaphragm 14 is deflected, and thereby indicates whether the transducer 10 is being carried to a higher elevation or to a lower elevation.

A speedup or lead network indicated generally at 24 applies the voltage across the filter 19 to a load, indicated as a resistor 26 connected between output terminals 25 and 27.

The transducer 10 is preferably constructed as described in United States Patent No. 2,999,386 with the transducer diaphragm 14 secured under substantial radial tension between support plates 28 and 30, which are appropriately of dielectric material. The support plates are firmly secured together as by clamping, and they are recessed to form chambers 32 and 34, respectively, on opposite sides of the diaphragm 14. Electrodes 36 and 38 are secured on the opposing recessed surfaces of the support plates; the electrodes preferably being identical and symmetrically spaced with respect to the diaphragm. As also shown, a supplementary chamber 35 is coupled through a conduit 37 of negligible pneumatic resistance to the chamber 34.

In order for the diaphragm to deflect in response to pressure changes caused by a change in the elevation of the transducer, an aperture 40 forms a direct passage through the support plate 28 between the chamber 32 and the atmosphere around the transducer 10. The pneumatic resistance of this passage is essentially zero. The chamber 34 is also vented to the environmental atmosphere of the transducer, but by means of a capillary tube 42 having a bore 44 of high pneumatic resistance.

The electrodes 36 and 38 receive an alternating voltage, preferably sinusoidal or a square wave with a waveform symmetrical about the zero axis, from the source 18 by way of a transformer 46 having a primary winding 66 and a center-tapped secondary winding 48. Electrical conductors 50 and 52 connect the ends of the secondary winding to the electrodes; the center tap 49 of the winding 48 is connected to ground. Thus, the two capacitors comprising the diaphragm 14 and electrode 36 on the one hand, and the diaphragm and electrode 38 on the other hand, form a differential capacitor arrangement, with the capacitances of these capacitors varying inversely as the diaphragm is deflected. The capacitors are in a species of bridge circuit with the two halves of the transformer winding 48. The output voltage of the bridge appears between the diaphragm and ground.

Accordingly, when the pressures within the chambers 32 and 34 are the same, the diaphragm 14 is undeflected and its electrical potential is essentially zero. When there are unequal pressures in the transducer chambers, the diaphragm 14 deflects into the chamber of lower pressure; the bridge circuit is thereby unbalanced and a voltage appears between the diaphragm and ground. The phase of this signal depends on the direction of diaphragm deflection, i.e., which of the chambers 32 and 34 has the greater pressure. Its amplitude increases with the amount of diaphragm deflection and hence indicates the difference in pressures between the chambers 32 and 34.

The illustrated phase detector 16 is a synchronous switch constructed with four diodes 54, 56, 58 and 60. The electrical output of the amplifier 12 is applied to the detector at a terminal 62 and, through the filter 19, at the opposite terminal 64.

The transformer 46 has a further secondary winding 68 connected between the other pair of opposed terminals 70 and 72 of the phase detector 16.

The voltage from the source 18 forward biases the diodes 54–60 to conduct during alternate half cycles. During the other half cycles, the detector diodes are reversed biased and thus nonconducting. The forward biasing current which the source 18 applies to the detector diodes exceeds the signal from the amplifier 12 so that when the diodes are forward biased, they conduct the transducer signal regardless of its polarity. As a result, the output of the phase detector 16, applied across the filter 19, is a half-wave rectified voltage whose polarity depends on the relative phase of the signal from the transducer 10 and thus on the direction in which the transducer diaphragm 14 is deflected.

The capacitor 20 serves to smooth the rectified transducer signal.

The network 24 applies the signal across the filter 19 to the output terminals 25–27. The load 26, which may, for example, be a meter or a recording device, responds to the amplitude and polarity of the signal. The operation of the network 24 and its relation to the rest of the instrument will now be discussed.

In accordance with the invention, to achieve high sensitivity, the transducer 10 is constructed with a capillary tube 42 that has a relatively high pneumatic resistance and with the coupled chambers 34 and 35 having a relatively high acoustic capacitance, thereby providing a long time constant for the pressure in the chamber 34. This is achieved by making the capillary tube 42 with a small diameter bore 44 or, equivalently, with considerable length. The acoustic capacitance, in turn, increases with the volume of the chambers 34 and 35. For subsequent reference, the chambers 34 and 35 and the capillary tube will be referred to as constituting a pneumatic circuit 39 coupled between the diaphragm side 14a and the transducer environment.

By way of illustration, the pneumatic circuit 39 may have a time constant of 1.5 seconds. That is, when the capillary tube bore 44 is completely blocked off at the end remote from chamber 34 and the transducer moved in elevation by one foot, after the bore is reopened, 1.5 seconds elapsed before the pressure difference between the chambers 32 and 34 equals $(1/e)$ of the value of this pressure difference immediately before the bore was reopened. By way of contrast, in a typical prior art transducer, the transducer has one-fifth this time constant and, correspondingly, one-fifth this sensitivity.

The five-fold increase in sensitivity elevates the signal level, even at low vertical velocities, to the point where it is substantially greater than the uncertainties introduced in various parts of the system. As discussed above, the most important of these errors are shifts of the zero point. Such shifts may occur as a result of changes in the transducer 10, source 18, transformer 46 or detector 16.

However, with the present instrument, the large pneumatic signal developed as the transducer is carried through to the output of the detector 16 and swamps these uncertainties, rendering them negligible.

Assuming that the load 26 represents a meter calibrated for use in a lower-sensitivity instrument, e.g. having one-fifth the sensitivity of the present instrument, the signal applied to the load must be reduced in magnitude. This is accomplished by the use of a series resistor 76 in the network 24. This resistor and the load 26 form a voltage divider that attenuates the signal to the correct level for the load.

In prior instruments, the increase in time constant caused by increasing the capillary resistance or the chamber capacitance would render the instrument unsuited for many applications. However, according to the invention, this loss in transducer response time is offset by delivering to the output terminals 25–27 both a portion of the output signal of the phase detector 16 and the time derivative of this signal. For this purpose, the network 24 is constructed with a capacitor 74 in parallel with the resistor 76. The resistor applies to the output terminals the component of the transducer signal indicating the instantaneous value of diaphragm deflection. The capacitor 74, on the other hand, conducts the transducer signal component corresponding to the time rate of change of diaphragm deflection. Thus, the load 26 receives the sum of these two signal components.

The signal component corresponding to the time derivative of the diaphragm displacement is the electrical analog of the derivative of vertical velocity. Its polarity is opposite to that of the error resulting from the slow response of the transducer 10. Thus, the capacitor 74 can be considered as applying to the instrument output terminals 25–27 a signal component that cancels the time lag error otherwise present at the output terminals.

Another way of viewing the circuit is to think in terms of the electrical analog of the transducer 10, viz a device containing a lag network. The network 24 is a lead network which can be arranged to compensate for the lag in the lag network, thereby eliminating the delay in transducer response to changes of vertical velocity.

It may at first seem impossible that the instrument as a whole can operate faster than its slowest link, the transducer 10. However, the delay in the transducer's response to a change in vertical velocity is really a delay in developing a pressure differential between the chambers 32 and 34 corresponding to the new velocity. There is essentially no delay in the process by which the new pressure differential is reached, namely a change in the rate of atmospheric flow through capillary 42. Almost simultaneously with a change in the vertical velocity, the flow rate at the inner end of capillary changes. The diaphragm 14 immediately responds by beginning to change its position. This motion of the diaphragm, as opposed to its actual position, is what is preferentially passed to the output terminals by the capacitor 74.

Of course if the capillary 42 is unduly elongated or restricted in cross section, there can be an appreciable delay between a change in vertical velocity and the corresponding change in the flow rate at the inner end of the capillary. In that case the full advantage of the invention may not be realized. However, even then the lead network 24 improves the overall response of the instrument.

The amount of the "time lag correction" which the capacitor 74 introduces is determined by the value of the capacitor relative to the value of the resistor 76 and is selected according to the time lag of the transducer 10. That is, the vertical rate instrument is constructed by first selecting the time constant of the transducer pneumatic circuit 39 to produce an output signal of sufficient amplitude to render essentially negligible the near-zero uncertainties discussed above. The network 24 is then constructed to correct whatever time lag the desired transducer design introduces and to maintain the transducer output signal "in step" with changes in the vertical velocity of the craft carrying the transducer 10.

The present invention thus overcomes uncertainty errors encountered in prior vertical rate instruments without degrading other performance characteristics.

Although described with reference to an atmospheric vertical rate instrument, the invention is suited for use in a variety of instruments that, considered generally, respond to velocity in the direction of a pressure gradient in a fluid medium.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense. For example, the invention is not limited to diaphragm-type pressure transducers nor to transducers having two chambers. It can be used in general, with pressure transducers that produce electrical signals in response to differences in pressure.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Apparatus providing an output signal responsive to velocity in the direction of a pressure gradient in a fluid medium, said apparatus comprising
   (A) a transducer
      (1) arranged to be subjected to a pressure changing at a rate in accordance with said velocity,
      (2) having sensing means and a pneumatic circuit,
         (a) said sensing means producing an electrical signal corresponding to the difference between first and second pressures, said signal changing in correspondence with the change of said pressure difference, where said first pressure corresponds to the pressure of said fluid medium environmental to said transducer,
         (b) said pneumatic circuit communicating with said fluid medium to develop said second pressure and being constructed with such a relatively long pneumatic time constant that said second pressure corresponds to the pressure of said medium at a time substantially earlier than the time to which said first pressure corresponds thereby to provide a substantial pressure difference for small vertical velocity so that said transducer has sufficient sensitivity to identify the direction of relatively small velocity,
   (B) output terminal means, and
   (C) an electrical lead network compensating for said pneumatic time constant and
      (1) having an input in circuit with said transducer to receive a signal responsive to said electrical signal and having an output connected with said output terminal means,
      (2) responding to said signal it receives to apply to said output terminals first and second substantial signal components,
         (a) said first signal component corresponding to the difference between said first and second pressures, and
         (b) said second signal component corresponding to the time rate of change of said pressure difference.

2. Apparatus according to claim 1 in which said lead circuit comprises a capacitor connected between said output terminal means and said circuit input and a resistor in parallel with said capacitor.

3. Apparatus according to claim 1
   (A) in which a characteristic of said transducer signal changes between two values according to which of said first and second pressures is larger, and
   (B) further comprising threshold means
      (1) connected with said transducer and the input of said circuit, and
      (2) altering said transducer signal applied to said output terminals according to the value of said characteristic.

4. Apparatus responsive to the direction and rate of velocity in the direction of a pressure gradient in a fluid medium, said apparatus comprising
   (A) pressure responsive transducer means arranged to be subjected to a pressure which changes in accordance with said velocity and having a pneumatic circuit comprising a chamber and a conduit communicating between said chamber and said environment, said chamber and said conduit providing a relatively large pneumatic time constant of preselected magnitude, to thereby provide said transducer means with a large time constant in response to a change in said pressure, said tansducer means producing an electrical output signal whose amplitude corresponds to the difference in pressure between the environment of the transducer means at a first time and the environment of the transducer means at an earlier time determined by said time constant, and (B) a compensating circuit
 (1) connected with said transducer means to receive said electrical signal,
 (2) having a pair of output terminals,
 (3) having first and second parallel electrical paths interconnecting said transducer means and said output terminals,
 (4) the attenuation of said first path decreasing relative to the attenuation of said second path for electrical signals that change in magnitude at increasing rates,
 (5) providing compensation for the delay in response resulting from said time constant.

5. The combination comprising
(A) a pressure transducer
 (1) having a diaphragm that deflects in response to the pressure differential across it,
 (2) having first pneumatic conduit means communicating between a first side of said diaphragm and the atmospheric pressure at said transducer,
 (3) having second pneumatic conduit means of relatively high pneumatic resistance relative to said first conduit means communicating between the second side of said diaphragm opposite said first side and the atmospheric pressure at said transducer, said second pneumatic conduit means providing said transducer with a relatively large pneumatic time constant of preselected magnitude to thereby delay the response of said transducer by a predetermined amount to a change in atmospheric pressure resulting from vertical velocity of said transducer,
 (4) producing an electrical signal whose amplitude and relative phase are responsive to the magnitude and direction, respectively, of the pressure differential across said diaphragm,
(B) a compensating circuit
 (1) having an input terminal connected with said transducer to receive a second signal responsive to said electrical signal,
 (2) having an output terminal,
 (3) arranged to apply to said output terminal means, in response to said second signal, first and second signal components corresponding respectively to the zero and first time derivatives of the pressure differential across said diaphragm,
 (4) to thereby compensate for said pneumatic time constant.

6. The combination defined in claim 5 in which said transducer has a chamber of relatively high acoustic capacitance coupled between said second side of said diaphragm and said second conduit means to thereby increase the time constant of said transducer.

7. Apparatus according to claim 5 further comprising electrical output means connected to said output terminals and responsive to the sum of said first and second signal components.

8. Apparatus according to claim 5
(A) further comprising rectifying means in circuit with said transducer and producing, in response to the relative phase of said electrical signal, a direct voltage whose polarity corresponds to the direction in which said diaphragm is deflected, and
(B) in which said compensating circuit is so arranged that said second signal it receives is produced from said direct voltage.

9. Apparatus responsive to the rate and direction of vertical velocity in the atmosphere, said apparatus comprising
(A) a pressure transducer
 (1) having a diaphragm that deflects in response to the pressure differential across it,
 (2) having a first side of said diaphragm exposed to the atmospheric pressure at said transducer,
 (3) having a conduit communicating between a second side of said diaphragm opposite said first side thereof and the atmospheric pressure at said transducer,
 (4) producing an alternating electrical signal whose amplitude corresponds to the amplitude of diaphragm deflection and whose relative phase differs by 180° according to the direction in which said diaphragm is deflected,
 (5) said conduit having a relatively high pneumatic resistance and arranged with said transducer to provide the transducer with a relatively large time constant relating a change in the atmospheric pressure of said transducer to a change in the pressure on the second side of said diaphragm to provide thereby a relatively large pressure differential across said diaphragm in response to a change in atmospheric pressure resulting from a change in altitude,
(B) rectifying means connected with said transducer to receive said electrical signal therefrom and developing in response thereto a direct current signal whose polarity corresponds to the direction of diaphragm deflection, and
(C) a time correcting network
 (1) having an input terminal connected with said rectifying means to receive said direct current signal,
 (2) having an output terminal,
 (3) having a capacitor connected in parallel with a resistor between said input terminal and said output terminal,
 (4) said resistor and said capacitor being arranged to provide said correcting network with a time constant so related to said time constant of said transducer to offset time delays between a change in the rate of said vertical velocity and a change in said pressure differential in said transducer.

10. Apparatus according to claim 9 further comprising output means connected to said output terminal and being responsive to the amplitude and polarity of the sum of the electrical signal components delivered thereto through said capacitor and through said resistor.

11. Apparatus according to claim 9 further comprising electrical amplifying means connected between said pressure transducer and said rectifying means to receive said alternating electrical signal from said transducer and to apply to said rectifying means an amplified signal corresponding to said signal.

12. Apparatus responsive to the rate and direction of vertical velocity in the atmosphere, said apparatus comprising
(A) a pressure transducer
 (3) having a diaphragm that deflects in reponse to the pressure differential across it,
 (2) having a first side of said diaphragm exposed to the atmospheric pressure at said transducer,
 (3) having a conduit of relatively high pneumatic resistance communicating between a second side of said diaphragm opposite said first side thereof and the atmospheric pressure at said transducer,
 (4) producing an alternating electrical signal whose amplitude corresponds to the amplitude of diaphragm deflection and whose relative phase differs by 180° according to the direction in which said diaphragm is deflected, (B) rectifying means
(1) including a phase demodulator synchronized with one of the phases of said alternating transducer output signal and comprising a multi-diode switching circuit having first and second pairs of opposed terminals,
(2) connected with said transducer to receive said electrical signal therefrom and developing in response thereto a direct current signal whose polarity corresponds to the direction of diaphragm deflection, (C) a filter circuit connected with one terminal of said first pair of opposed terminals and so arranged that said transducer electrical signal is applied to said rectifying means between the other terminal of said first pair of opposed terminals and said filter circuit, and (D) a time correcting network
(1) having an input terminal connected with said rectifying means to receive said direct current signal and connected to said filter circuit,
(2) having an output terminal,
(3) having a capacitor connected in parallel with a resistor between said input terminal and said output terminal.

References Cited

UNITED STATES PATENTS

| | | | |
|---|---|---|---|
| 2,775,122 | 12/1956 | Smith et al. | 73—179 |
| 2,904,735 | 9/1959 | Cullen et al. | 73—398 |
| 2,906,653 | 11/1960 | Linlor et al. | 73—398 |
| 2,999,386 | 9/1961 | Wolfe | 73—398 |
| 3,055,214 | 9/1962 | McLane | 73—179 |
| 3,181,359 | 5/1965 | Osterstrom | 73—407 |
| 3,274,833 | 9/1966 | Ollivier et al. | 73—407 |

LOUIS R. PRINCE, *Primary Examiner.*

N. B. SIEGEL, *Assistant Examiner.*